United States Patent [19]

Butler

[11] Patent Number: 4,824,059

[45] Date of Patent: Apr. 25, 1989

[54] CUSHIONING DEVICE FOR REMOTE CONTROL TELEVISION EQUIPMENT, AND ASSEMBLY THEREOF

[76] Inventor: Les I. Butler, 13028 Valleyheart Dr., #205, Studio City, Calif. 91604

[21] Appl. No.: 150,851

[22] Filed: Feb. 1, 1988

[51] Int. Cl.$^4$ ............................................. F16M 11/00
[52] U.S. Cl. ........................... 248/176; 206/523; 206/591; 206/592; 248/309.1
[58] Field of Search ................ 206/523, 591, 592; 248/176, 177, 127, 146, 309.1, 311.2, 314; 273/148 B

[56] References Cited

U.S. PATENT DOCUMENTS

| | | | |
|---|---|---|---|
| 3,346,221 | 10/1967 | Farmer | 206/523 X |
| 4,009,781 | 3/1977 | Asnew et al. | 206/523 X |
| 4,201,293 | 5/1980 | Rigazio et al. | 206/45.19 |
| 4,234,092 | 11/1980 | Axel | 206/523 |
| 4,261,467 | 4/1981 | Shariff et al. | 206/523 |
| 4,314,309 | 2/1982 | Read | 361/331 |
| 4,386,702 | 6/1983 | Schultz et al. | 206/523 |
| 4,494,754 | 1/1985 | Wagner, Jr. | 273/148 B |
| 4,524,868 | 6/1985 | Buckley et al. | 206/523 X |
| 4,530,504 | 7/1985 | Long, Jr. | 273/148 B |
| 4,573,682 | 3/1986 | Mayon | 248/176 X |
| 4,602,715 | 7/1986 | Sarver et al. | 206/523 |
| 4,610,355 | 9/1986 | Maurer | 206/523 X |
| 4,621,022 | 11/1986 | Kohaut et al. | 428/397 |
| 4,709,817 | 12/1987 | Keady et al. | 206/523 |
| 4,739,897 | 4/1988 | Butler | 206/523 X |

OTHER PUBLICATIONS

Supergaming (Video Gaming Illustrated, by Jim Clark, p. 20.

Primary Examiner—Ramon O. Ramirez
Attorney, Agent, or Firm—John J. Posta, Jr.

[57] ABSTRACT

The cushioning device is used on remote control television equipment and includes a stretchable resilient elastomeric block of natural or synthetic rubber or plastic. The block has closed sides and bottom and a top with an open cavity therein which in one instance is a slit adapted to receive and releasably grip one or more remote control television panels inserted therein at or below the top of the block. When so inserted, the combination of the cushioning device and panel(s) forms the improved assembly. The block also has an opening in one side to allow passage of wires and/or radio signals from the remote control panel(s) in the block to the television equipment. The control panel(s) can be one or more remote channel selectors, volume and on-off selectors and video tape television controls. A pocket is also provided in another side of the block in one embodiment to releasably receive a television channel program guide. The block may also have removable top dust lid and cushioned feet. The device is simple, durable, inexpensive and effective in cushioning and protecting remote control panels against damage, providing the panels with convenient storage and immediate access, and accommodating panels of various sizes and shapes.

8 Claims, 2 Drawing Sheets

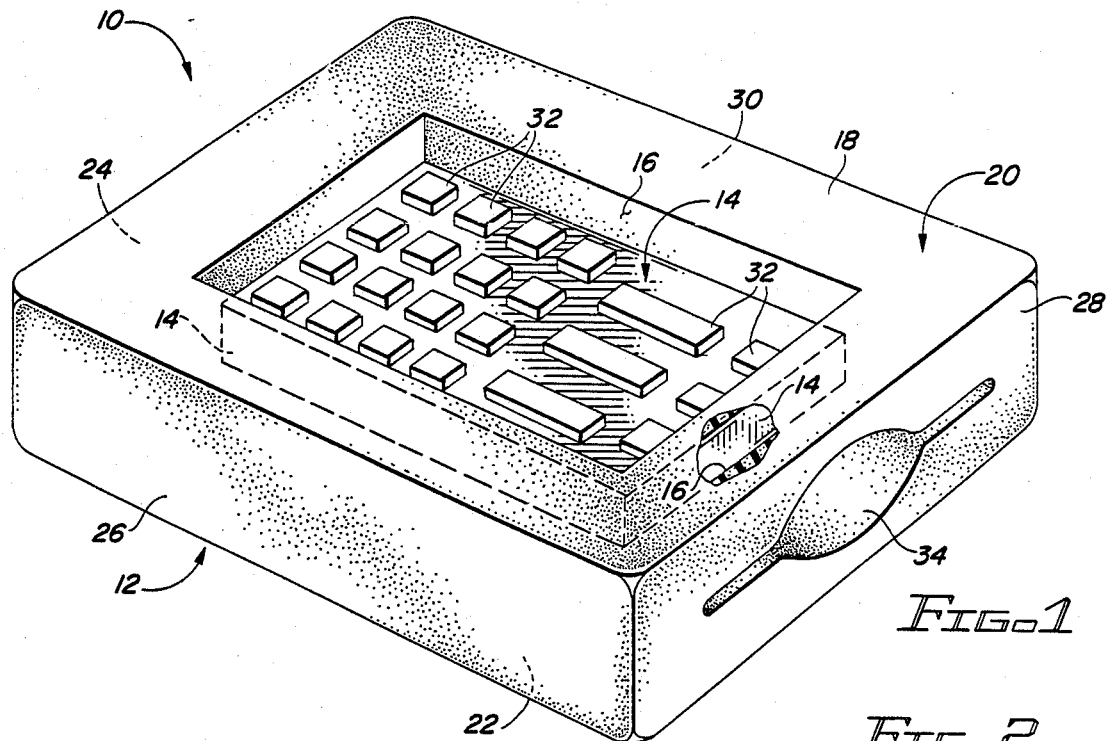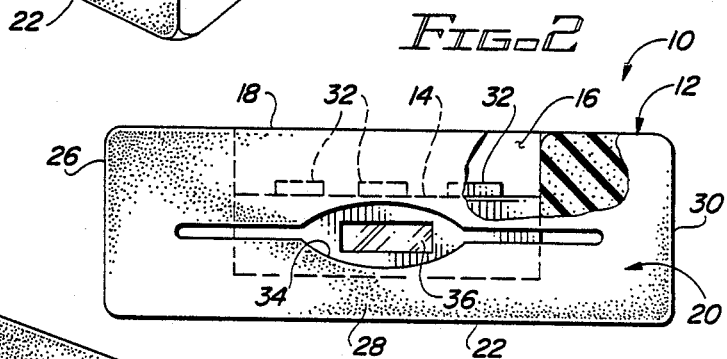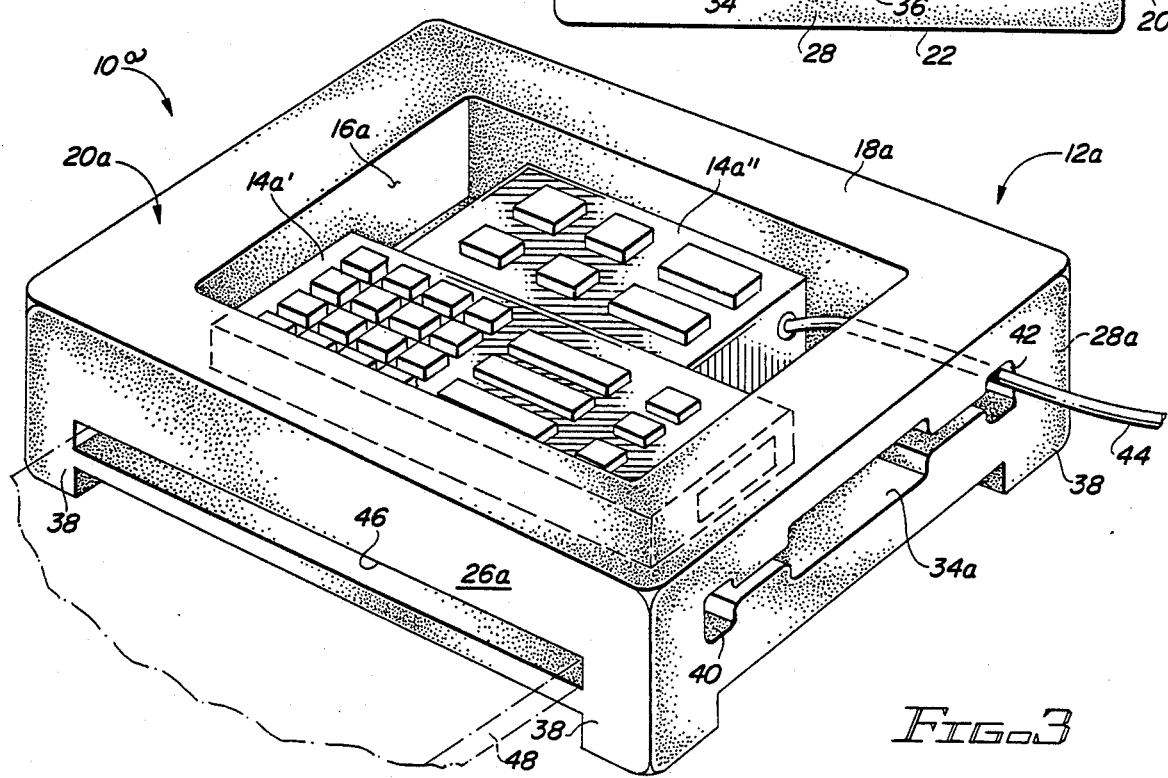

4,824,059

CUSHIONING DEVICE FOR REMOTE CONTROL TELEVISION EQUIPMENT, AND ASSEMBLY THEREOF

BACKGROUND OF THE INVENTION

1. Field of the Invention

The present invention generally relates to protective devices and, more particularly, to a cushioning device for remote control television equipment.

2. Prior Art

Various types of cushioning devices have been used with readily damagable equipment. For example, during the storage and shipment of clocks, watches, motor controls, electrical test equipment and the like, rigid foam polystyrene shells, strips and the like are used to encase and cushion such equipment against vibration and damage. Various configurations of such polystyrene protective containers are shown in U.S. Pat. Nos. 4,314,309, 4,602,715, 4,261,467, 4,201,293 and 3,346,221. Molded fiberglass has also been used for protective casings and the like. See, for example, U.S. Pat. No. 4,234,092.

Once delicate equipment arrives at its destination, however, it is customarily removed from its protective casing and is then used without any further protective containment. It has been found that remote control television equipment such as remote television channel selector panels, remote television on-off switches, remote videotape control panels and the like for television sets which are used without protective casings are especially subject to damage by being dropped or having solid objects fall on them as they rest on coffee tables, side and end tables and the like.

It would be desireable to be able to provide effective cushioning devices for remote control television equipment to encase the equipment while the equipment is in use, in order to reduce the possibility of their damage. Such cushioning devices should preferably be capable of protecting the equipment against vibrations, jars, drops, etc., and be adaptable to a wide variety of sizes and shapes of such equipment. Moreover, such devices should be inexpensive and durable.

SUMMARY OF THE INVENTION

The improved cushioning device of the present invention satisfies all the foregoing needs. It, together with the television remote control equipment being cushioned therein, forms the improved assembly of the present invention. The cushioning device is substantially as set forth in the Abstract.

In this regard, the improved cushioning device comprises a flexible, resilient, stretchable elastomeric block having closed side and bottom, and an open top with an open television remote control panel-receiving capacity. Since the cavity stretches, it is capable of releasably grippingly receiving remote control panels and the like of various dimensions and shapes and holding them at or below the top of the block and cushioned from jars and bumps and fully in view for easy use while in the block. The block can include an openable lid, cushioned legs and a side opening to permit passage of wires and/or radio signals from the remote control device to the television equipment.

The block can also include a second side opening for reception of a television program guide magazine or other printed listing. Further features of the improved device and assembly of the present invention are set forth in the following detailed description and accompanying drawings.

DRAWINGS

FIG. 1 is a schematic perspective view, partly broken away, of a first preferred embodiment of the improved cushioning device and assembly of the present invention;

FIG. 2 is a schematic front elevation of the device and assembly of FIG. 1;

FIG. 3 is a schematic perspective view, partly broken away, of a second preferred embodiment of the improved device and assembly of the present invention;

DETAILED DESCRIPTION

FIGS. 1 and 2

Figure 4:
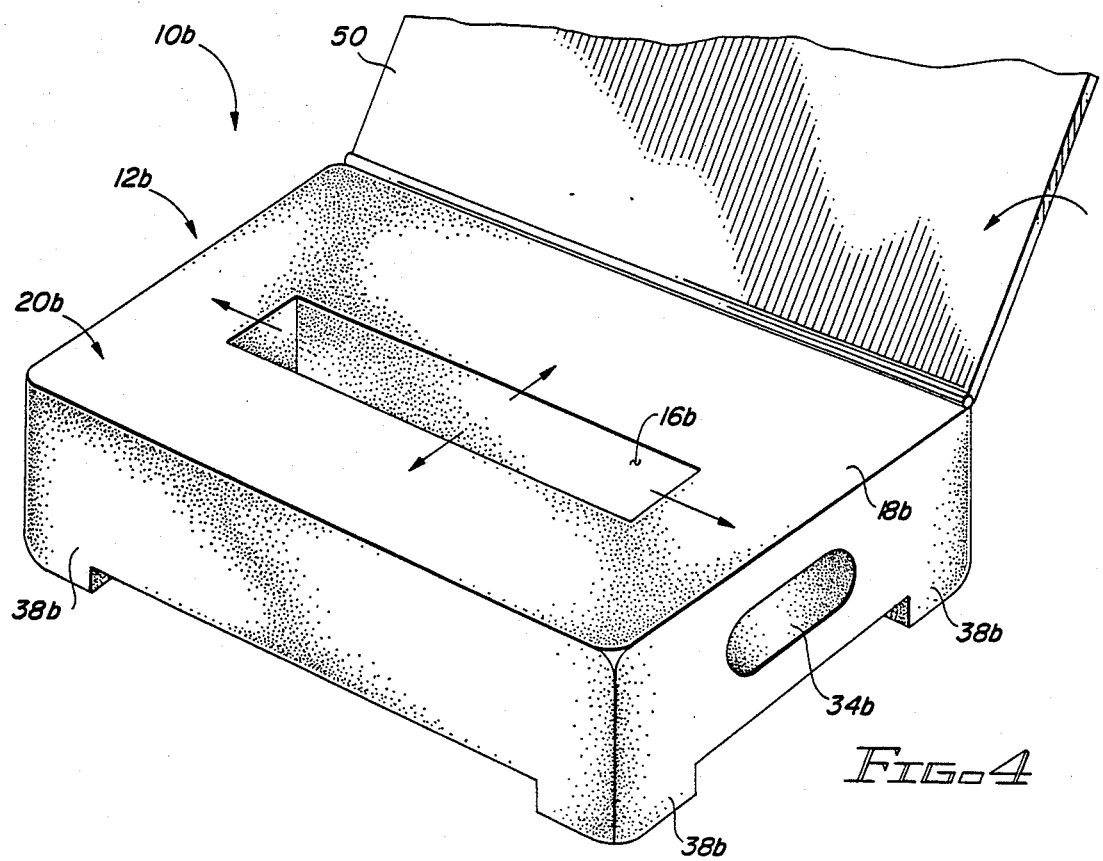
FIG. 4 is a schematic perspective view, partly broken away, of a third preferred embodiment of the improved cushioning device of the present invention; and, FIG. 5 is a schematic perspective view, partly broken away, of the device of FIG. 4 and containing a remote television control panel to form therewith a third preferred embodiment of the improved assembly of the present invention.

Now referring more particularly to FIGS. 1 and 2 of the accompanying drawings, a first preferred embodiment of the improved cushioning device and assembly of the present invention is schematically depicted therein. Thus, assembly 10 is shown which comprises a cushioning device 12 in which is removably inserted a remote control television item of equipment, specifically channel control selector panel 14.

Panel 14 is recessed in a cavity 16 open in the top 18 of a flexible, resilient, stretchable elastomeric, generally rectangular block 20 of natural or synthetic rubber or plastic having closed bottom 22 and closed sides 24, 26, 28 and 30.

Cavity 16 is generally rectangular and stretches so that it tightly but releasably grips the periphery of rectangular panel 14, holding panel 14 against jarring, vibrations, bumps and damage. Panel 14 can be of various sizes and shapes and still be received and held in cavity 16. Even if block 20 is knocked off a coffee table or the like and overturned, panel 14 will stay recessed in cavity 16 and fully protected. Likewise, if an object such as a book which is larger than block 20 falls on it, panel 14 will still be protected. Yet panel 14 is available for instant use, its control buttons 32 in full view. If desired, panel 14 can be placed in cavity 16 with buttons 32 above or at the top surface of block 20.

Block 20 also has an opening or passageway 34 which extends from side 28 to cavity 16 for passage of the radio control beam from beam emanator 36 of panel 14 (FIG. 2) to the television equipment to be remotely controlled by it. Alternatively, opening 34 could be used as a passageway through which wires could pass from panel 14 to the television equipment wired thereto, if panel 14 utilized wiring instead of emanator 36 to control such equipment.

It will be understood that block 20 can be of any suitable size and shape, as can cavity 16 and panel 14. Block 20 may be slip resistant and of attractive appearance for optimal table top use. It is inexpensive, versatile and effective in cushioning panel 16.

FIG. 3

A second preferred embodiment of the improved cushioning device and assembly of the present invention is schematically depicted in FIG. 3. Thus, assembly 10a is shown. Components thereof similar to those of assembly 10 bear the same numerals but are succeeded by the letter "a". Assembly 10a is identical to assembly 10, except as follows:

(a) block 20a is raised up on resilient, integral, flexible elastomeric legs 38;
(b) opening 34a in side 28a is rectangular and has a pair of interconnected side openings 40 and 42 for wiring 44 (shown only in opening 42);
(c) a pair of panels $14a^1$ and $14a^{11}$ are abutted side by side in cavity 16a, panel $14a^1$ being a wireless radio beam-emanating radio control panel, while panel $14a^{11}$ being a wired remote on-off and volume control panel; and
(d) side 26a has a pocket 46 therein shown, releasably holding a television channel program guide listing 48.

Assembly 10a has the other advantages of assembly 10.

Figure 5:
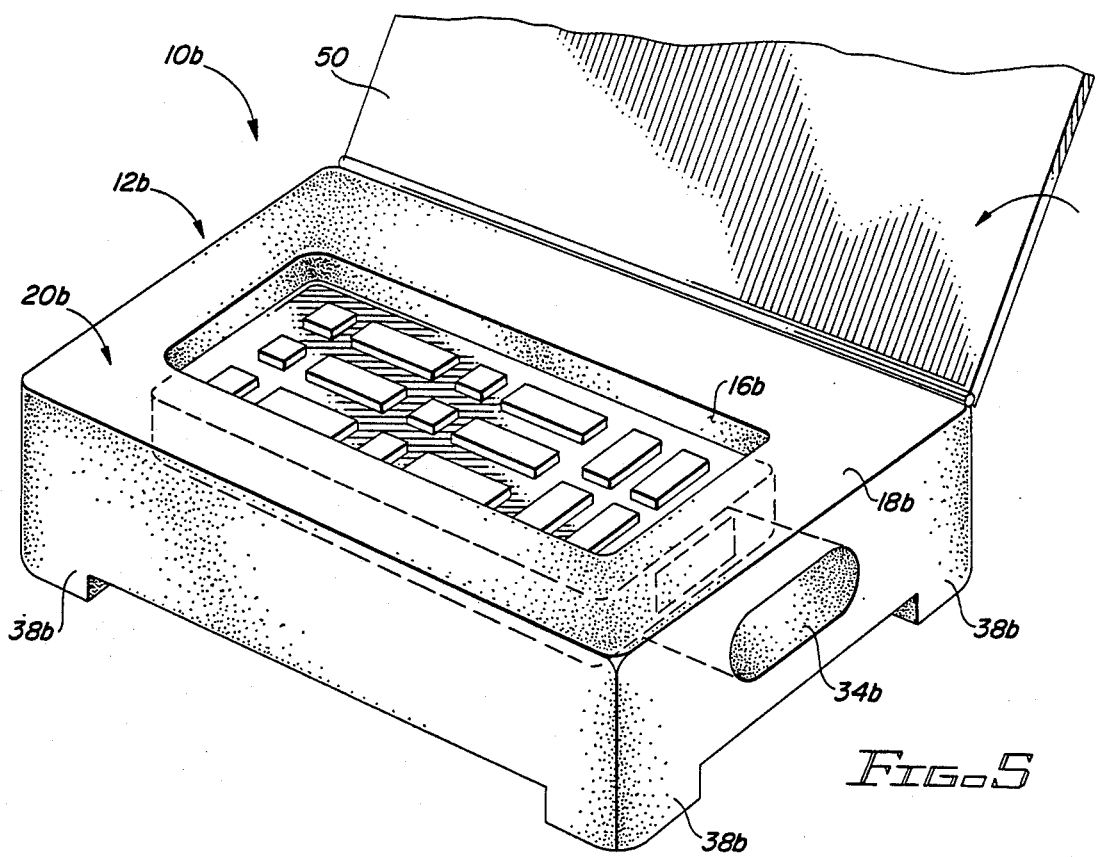

FIGS. 4 and 5

A third preferred embodiment of the improved assembly and cushioning device of the present invention is depicted in FIGS. 4 and 5. Thus, assembly 10b is shown. Components thereof similar to those of assembly 10 or 10a bear the same numerals but are succeeded by the letter "b". Assembly 10b is substantially identical to assembly 10, except as follows:

(a) block 20b has a very narrow cavity 16b (FIG. 4) in top 18b which stretches easily to accommodate and grip remote television control panel 14b (FIG. 5);
(b) block 20b has a hinged openable top dust lid 50 connected to top 18b; and,
(c) block 20b has depending cushioned bottom legs 38b.

Assembly 10b has the other advantages of assemblies 10 and 10a.

Various other modifications, changes, alterations and additions can be made in the improved assembly and cushioning device of the present invention, their components and parameters. All such modifications, changes, alterations and additions as are within the scope of the appended claims form part of the present invention.

PRIOR ART STATEMENT

A preliminary patentability search has been carried out on the subject matter of the present patent application and the following U.S. patents were located:

| U.S. Pat. No. | Inventor(s) |
| --- | --- |
| 3,346,221 | Farmer |
| 4,201,293 | Rigazio, et al. |
| 4,234,092 | Axel |
| 4,261,467 | Shariff, et al. |
| 4,314,309 | Read |
| 4,602,715 | Sarver, et al. |
| 4,621,022 | Kohaut, et al. |

The invention set forth in the claims of the present application are believed to be clearly patentable over and unobvious in view of the above-lited references. Farmer discloses a hard plastic vibration dampener with cushioned feet. Rigazio, et al., discloses rigid styrofoam packaging for a clock; Alex is similar, as are Shariff, et al., and Read; Sarver, et al., is similar, but also uses resilient foam strips inside the rigid outer shells. Kohaut, et al., deals with tiny shaped foam particles to be poured loosely into a container around an item to be cushioned.

None of the above-listed patents disclose a flexible, resilient, stretchable elastomeric block into the top of which are releasably inserted one or more remote control panels for television equipment. Such panels are held securely but removably in the top of the block, cushioned from damage and immediately available for use or storage. The block has an opening therethrough to allow passage of wires and/or radio signals from the panels to the television equipment. None of this is shown in the above-listed patents. The patents merely show storage and shipping cartons not intended to be used with the encased product.

What is claimed is:

1. An improved cushioning device for remote control television equipment, said device comprising a stretchable, resilient elastomeric block having a closed bottom and sides and a top with an open cavity therein adapted to grippingly receive a remote television control panel, and having it available for immediate use while in said block, said block also having an opening in one side thereof in communication with said cavity for passage of wires and radio signals from said remote control panel to television equipment wherein said block has a pocket in another side thereof for reception of a television program guide magazine.

2. An improved cushioning device for remote control television equipment, said device comprising a stretchable, resilient elastomeric block having a closed bottom and sides and a top with an open cavity therein adapted to grippingly receive a remote television control panel, and having it available for immediate use while in said block, said block also having an opening in one side thereof in communication with said cavity for passage of wires and radio signals from said remote control panel to television equipment, wherein said block has a dust lid removably disposed over said top.

3. The improved device of claim 2 wherein said lid is hinged to the upper end of one of said sides and wherein said block has botton cushioning feet.

4. An improved cushioned remote control television assembly, said assembly comprising, in combination:
   (a) at least one remote control television panel; and,
   (b) a stretchable resilient elastomeric block having a closed bottom and sides and a top with an open cavity therein in which said television panel is releasably gripped by the portions of said top defining said cavity, said block also having an opening in one side thereof in communication with said cavity for passage of wires and radio signals from said panel to television equipment, wherein a plurality of said remote control panels are disposed in abutting relation in said cavity.

5. An improved cushioned remote control television assembly, said assembly comprising, in combination:
   (a) at least one remote control television panel; and,
   (b) a stretchable resilient elastomeric block having a closed bottom and sides and a top with an open cavity therein in which said television panel is releasably gripped by the portions of said top defining said cavity, said block also having an opening in one side thereof in communication with said cavity for passage of wires and radio signals from said panel to television equipment, wherein said block has a pocket in a side thereof for insertion of a television program guide.

6. An improved cushioned remote control television assembly, said assembly comprising, in combination:
 (a) at least one remote control television panel; and,
 (b) a stretchable resilient elastomeric block having a closed bottom and sides and a top with an open cavity therein in which said television panel is releasably gripped by the portions of said top defining said cavity, said block also having an opening in one side thereof in communication with said cavity for passage of wires and radio signals from said panel to television equipment, wherein said block has a dust lid releasably disposed over said top.

7. An improved cushioned remote control television assembly, said assembly comprising, in combination:
 (a) at least one remote control television panel; and,
 (b) a stretchable resilient elastomeric block having a closed bottom and sides and a top with an open cavity therein in which said television panel is releasably gripped by the portions of said top defining said cavity, said block also having an opening in one side thereof in communication with said cavity for passage of wires and radio signals from said panel to television equipment, wherein said lid is hinged to said block and wherein said block bottom has depending cushioning feet.

8. An improved remote control television panel assembly, comprising:
 (a) a remote control panel having signal emission means for controlling a television set,
 (b) a resilient elastomeric block of cushioning material,
 (c) said block having a cavity therein which is dimensioned to grippingly receive therein said panel,
 (d) said block further having an opening in one side thereof to allow signals emanating from said signal emission means to be directed upon a television set,
 (e) wherein a plurality of said remote control panels are disposed in abutting relation in said cavity.

* * * * *